United States Patent [19]

Forney et al.

[11] Patent Number: 5,472,169
[45] Date of Patent: Dec. 5, 1995

[54] IMPACT RESISTANT VALVE DESIGN

[75] Inventors: R. Scott Forney, New London; Jeremiah J. Rowan, Norwich, both of Conn.

[73] Assignee: General Dynamics, Inc., Falls Church, Va.

[21] Appl. No.: 127,248

[22] Filed: Sep. 27, 1993

[51] Int. Cl.$^6$ ............... F16K 31/143; F16K 31/524; F16K 47/00
[52] U.S. Cl. ............... 251/54; 74/53; 74/569; 251/263; 251/335.3
[58] Field of Search ............... 251/48, 54, 251, 251/335.3, 263; 74/53, 54, 55, 569

[56] References Cited

U.S. PATENT DOCUMENTS

| 845,373 | 2/1907 | Payne | 251/54 |
|---|---|---|---|
| 1,520,892 | 12/1924 | Steensen | 251/54 |
| 2,557,287 | 6/1951 | Hormann | 251/54 |
| 2,936,002 | 5/1960 | Opletal et al. | 251/54 |
| 2,962,099 | 11/1960 | Clark, Jr. | 251/54 |
| 3,211,416 | 10/1965 | Billeter et al. | 251/54 |
| 4,318,530 | 3/1982 | Lissmyr et al. | 251/54 |

Primary Examiner—George L. Walton
Attorney, Agent, or Firm—St. Onge Steward Johnston & Reens

[57] ABSTRACT

A shock absorbing device is shown having a cartridge attached to a valve, and an actuator. The valve houses a stem which is activated by the actuator to move between an open and a closed position. The actuator includes a cam having a cam surface and a roller which rides along at least a portion of the cam surface. A yoke, which is moved by the roller, is interconnected to a plunger which is attached to the stem. The cartridge includes an upper piston, a lower piston, and a plug having a channel therethrough, positioned between the pistons, the upper piston being spring biased towards the plug. The pistons are positioned in relation to the plug and cartridge housing so as to form an upper and lower reservoir, which are substantially filled with fluid, preferably ethylene glycol. The lower piston is capable of being in contact with the actuator yoke. The plug channel is sufficiently small to avoid flow of the fluid during an impact of a predetermined force and large enough to permit flow of the fluid during manual operation of the valve; the channel is preferably about one sixty-fourth of an inch in diameter. In operation, for example, moving the stem from the closed to the open position causes the lower piston to force fluid from the lower reservoir, through the channel and into the upper reservoir. When the stem is returned to the closed position, the spring biased upper piston forces fluid into the lower reservoir.

23 Claims, 5 Drawing Sheets

IMPACT RESISTANT VALVE DESIGN

DESCRIPTION

TECHNICAL FIELD

The present invention relates to valves having shock absorbing features used to prevent the valves from becoming faulty due to high impact stresses. The inventive valves are used to control and maintain fluids which are under pressure.

Submersible vehicles typically carry both oxygen tanks and fresh water tanks outside the vehicle's boundaries. Indeed, in vehicles designed for long term submersion, such tanks are critical in case of failure of internal oxygen and/or fresh water production facilities. When it is desired to feed oxygen or water into the vehicle, a valve is opened, the desired amount of oxygen or water is permitted to flow into the vehicle, and afterwards the valve is closed. It is very important to the safety of the persons inside the submersible vehicle that the valve regulating the flow of the oxygen or water operate efficiently at all times. For example, should the valve fail, which could occur in an underwater explosion or collision, treacherous waters or other high impact stresses, water could flood the vehicle, which may overwhelm the ability to pump the water out. As a result, the vehicle and its occupants could be lost. Pure oxygen flowing into the vehicle could feed a fire and result in an unsafe condition for the crew and passengers.

Moreover, submersible vehicles also contain means for pumping water outside the vehicle boundary. Since the external water is at a higher pressure when the vehicle is submerged, a valve must maintain its integrity after a shock, to keep external water from flowing in.

The need for a shock resistant valve holds true for any application where a vehicle is in a non-safe environment, and spare oxygen and/or fresh water tanks are needed. For instance, space vehicles and upper atmosphere aircraft likely have need for a shock resistant valve to regulate air and/or water flow.

Not only must the valve operate efficiently both during and after experiencing high impact stresses or shock, the valve must also operate efficiently by both remote control and by manual operation.

Valves, which are known, generally fail to operate efficiently when exposed to high impact stresses under test conditions. Although the precise reason for this is not fully understood, it is believed to be caused by the fact that the stem inside the valve has some room to travel freely. As such, the stem contacts its facing surface with enormous force and deforms, compressing slightly because of this impact. Although the compression is quite small, it is sufficient to prevent the stem from forming a tight seal. Thus, water or oxygen leaks into the vehicle after the shock and resultant compression of the stem.

It is desirable, therefore, to prepare a shock resistant cartridge valve having a shock absorbing device which can withstand high impact stresses and still operate efficiently, which prevents free travel of the stem during impact, and which prevents the stem from compressing during impact.

SUMMARY OF THE INVENTION

Accordingly, it is an object of the present invention to provide a shock absorbing valve that operates efficiently after exposure to a high impact stress.

It is another object of the invention to provide a shock absorbing valve that prevents free travel of a valve stem during impact.

It is yet another object of the present invention to provide a shock absorbing device that prevents compression of a valve stem caused by a high impact stress.

It is still another object of the present invention to provide a shock absorbing valve that continues to operate efficiently after experiencing a high impact stress and which allows the valve to be manually operated.

It is a further object to provide a shock absorbing device that can be attached to existing valves with little retooling.

To overcome the deficiencies of the prior art and to achieve the objects and advantages listed above, Applicants disclose a cartridge for reducing stem compression caused by high impact stresses to be installed in a valve having a stem, and an actuator attached to the valve for moving the stem between a closed position and an open position.

In a preferred embodiment, the actuator includes a cam having a cam surface. A roller rides along at least a portion of the cam surface and raises and lowers an interconnected yoke accordingly. The yoke has lower flanges which are interconnected to a plunger, which in turn is attached to the stem. As such, movement of the cam raises and lowers the stem, moving the stem between an open and a closed position.

The shock absorbing cartridge is secured to the actuator and includes an upper and lower piston. The lower surface of the lower piston is in substantially constant contact with the upper surface of the yoke. The upper piston is spring biased towards the lower piston.

A plug having a channel is positioned between the pistons and within the cartridge housing such that the plug and two pistons form an upper and lower reservoir. The reservoirs are substantially filled with a fluid.

When the valve stem is in the closed position, spring biased upper piston forces fluid from the upper reservoir to the lower reservoir through the plug channel. Thus, the lower piston is maximally displaced from the lower surface of the plug and contacts the upper surface of the yoke, and the lower surface of the upper piston is minimally displaced from the plug. As such, a majority of the fluid is located in the lower reservoir.

In the preferred embodiment, the stem can be moved from the closed position to the open position in the following manner. The cam is moved towards the actuator housing. As such, the roller rides up the cam surface forcing the yoke to also rise upward. The yoke, interconnected to the plunger, pulls the stem away from its adjacent tank orifice.

The upward movement of the yoke forces the lower piston to move towards the plug, forcing the fluid to flow through the plug channel and into the upper reservoir. As the fluid fills the upper reservoir, it forces the spring-biased upper piston to become maximally displaced from the upper surface of the plug.

When the valve is returned to the closed position, the roller rides downwardly on the cam surface bringing the yoke with it. As such, the spring biased upper piston operates to force fluid from the upper reservoir, through the plug channel, and into the lower reservoir. As such, the upper surface of the lower piston becomes maximally displaced from the plug lower surface, while the lower surface of the upper piston is minimally displaced from upper surface of the plug.

The invention and its particular features and advantages will become more apparent from the following detailed description when considered with reference to the accompanying drawings.

DETAILED DESCRIPTION OF THE DRAWINGS

Figure 2:
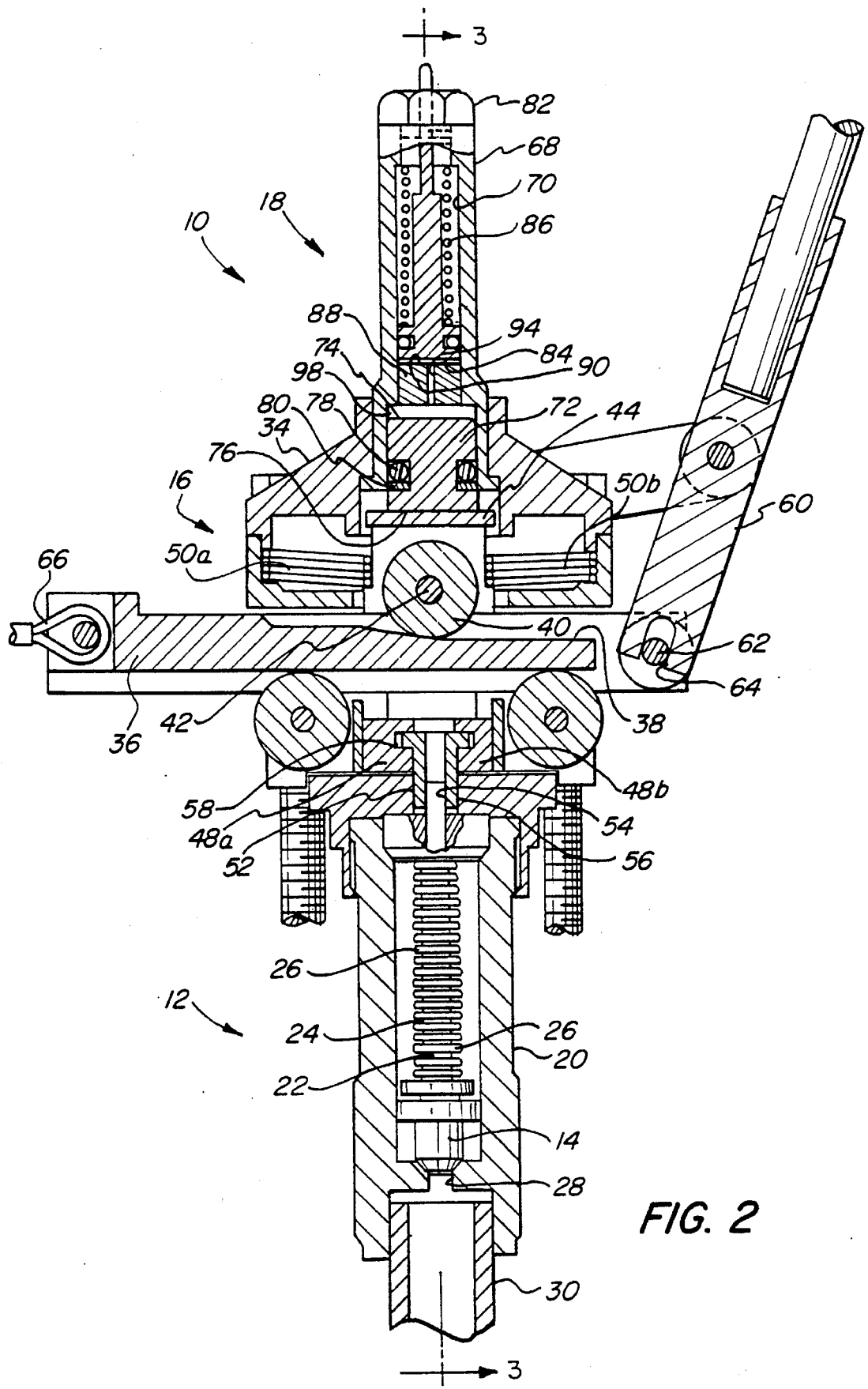
FIG. 2 is a cross sectional view of the actuator, shown in FIG. 1 modified for attachment to a cartridge, constructed in accordance with the present invention, taken along line 2—2 of FIG. 3, and showing the valve in a closed position.

Referring to the drawings in detail, a shock absorbing device, constructed in accordance with the invention, is shown and generally designated by the reference numeral 10. It should be noted that for the sake of clarity all the components and parts of device 10 are not shown and/or marked in all the drawings. As used in this description, the terms "up", "down", "top", "bottom", "left" and "right", etc. refer to device 10 when in the orientation illustrated in FIG. 2, although it will be recognized that a device 10 may be in any of various orientations when in use; that is, the orientation in FIG. 2 is not necessary for operability. Furthermore, it should be understood that the device 10 has been written for use with a water or oxygen tank solely for convenience. Device 10 is equally suited for other applications.

In the preferred embodiment, shock absorbing device 10 generally includes valve 12 having stem 14, actuator 16 for moving stem 14 between an open and closed position, and cartridge 18, adjacent actuator 16, for reducing stem compression during high impact stresses. See FIGS. 2–5.

Figure 3:
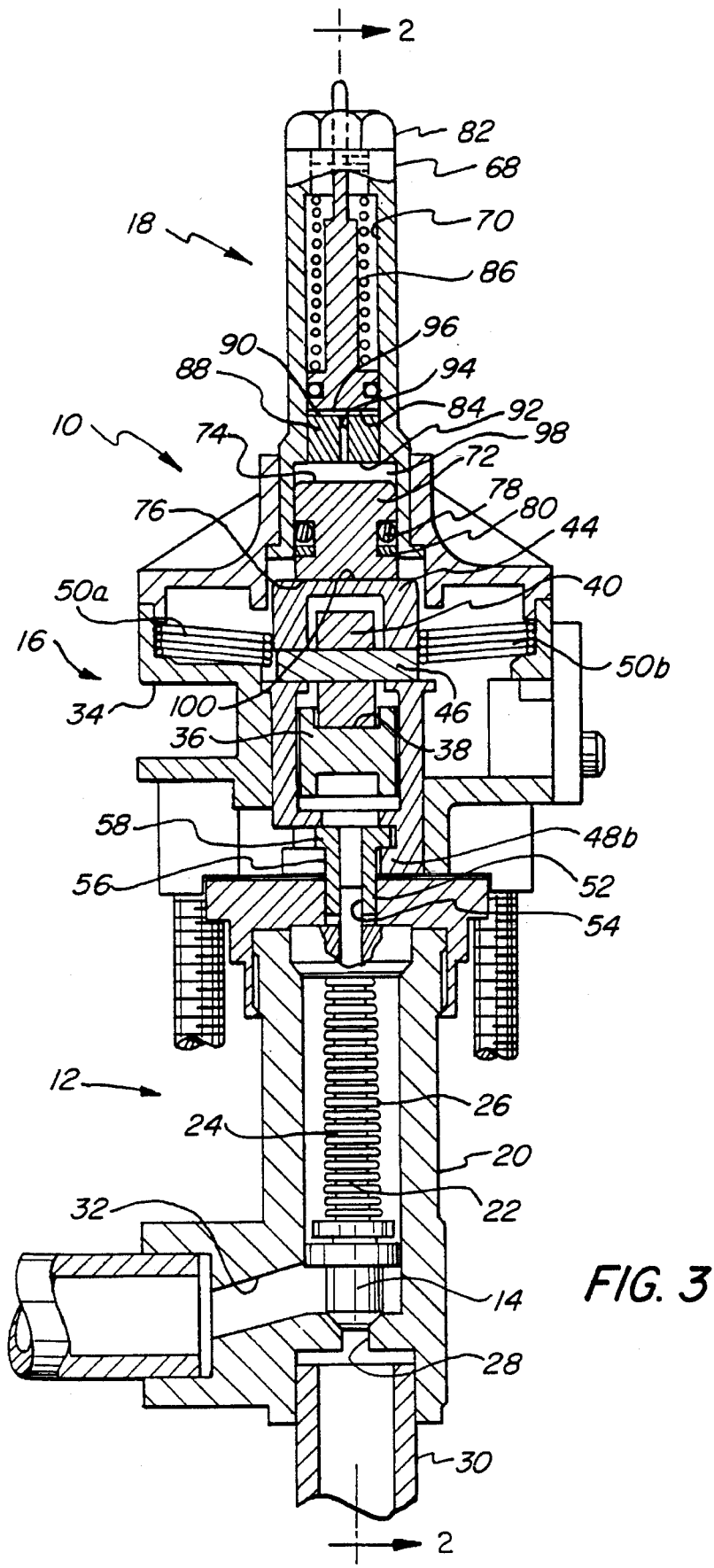
FIG. 3 is a cross sectional view of FIG. 2, taken along line 3—3.
Figure 4:
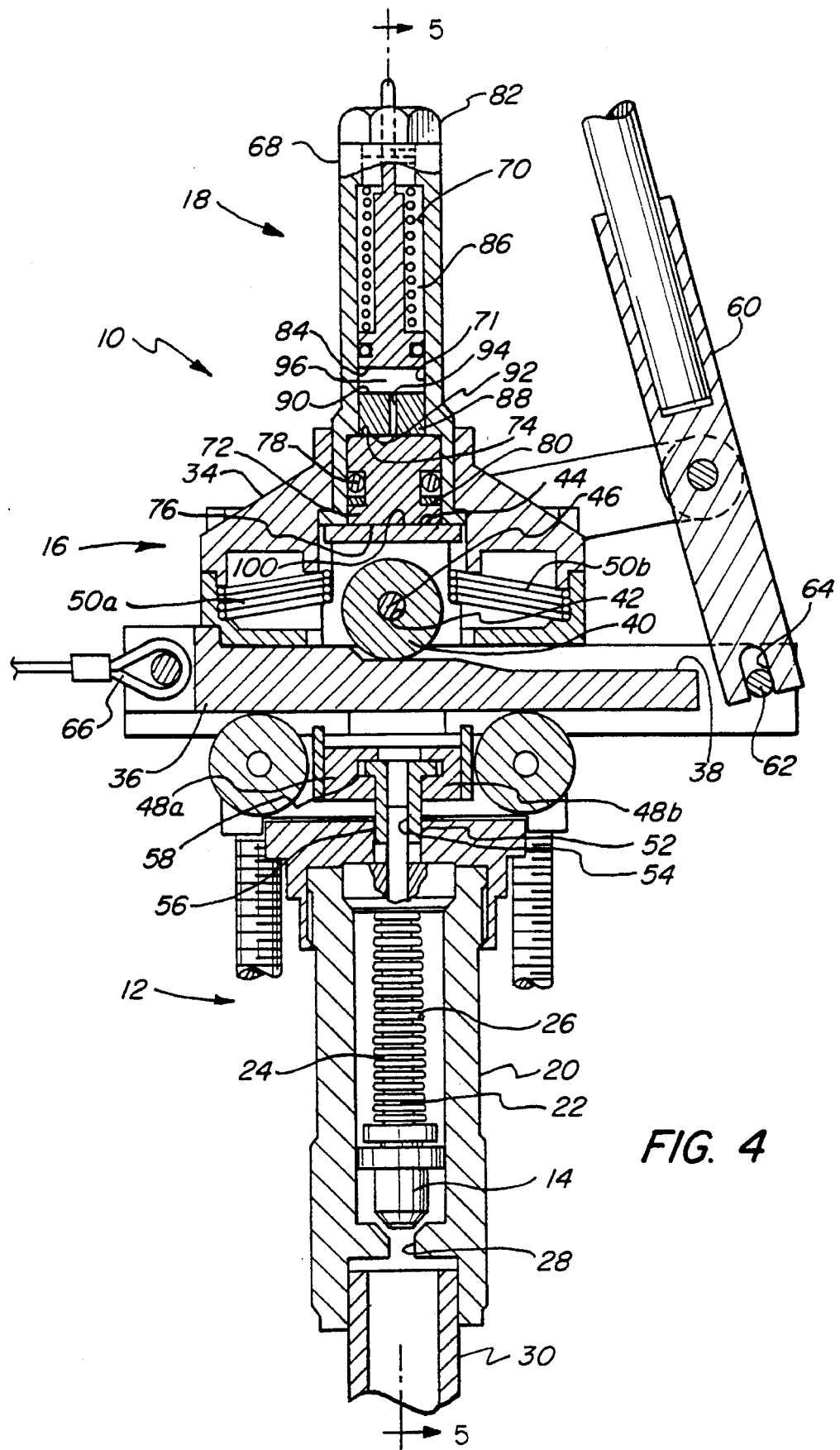
FIG. 4 is a cross sectional view of FIG. 5, taken along line 4—4, similar to that shown in FIG. 2, showing the valve in an open position.
Figure 5:
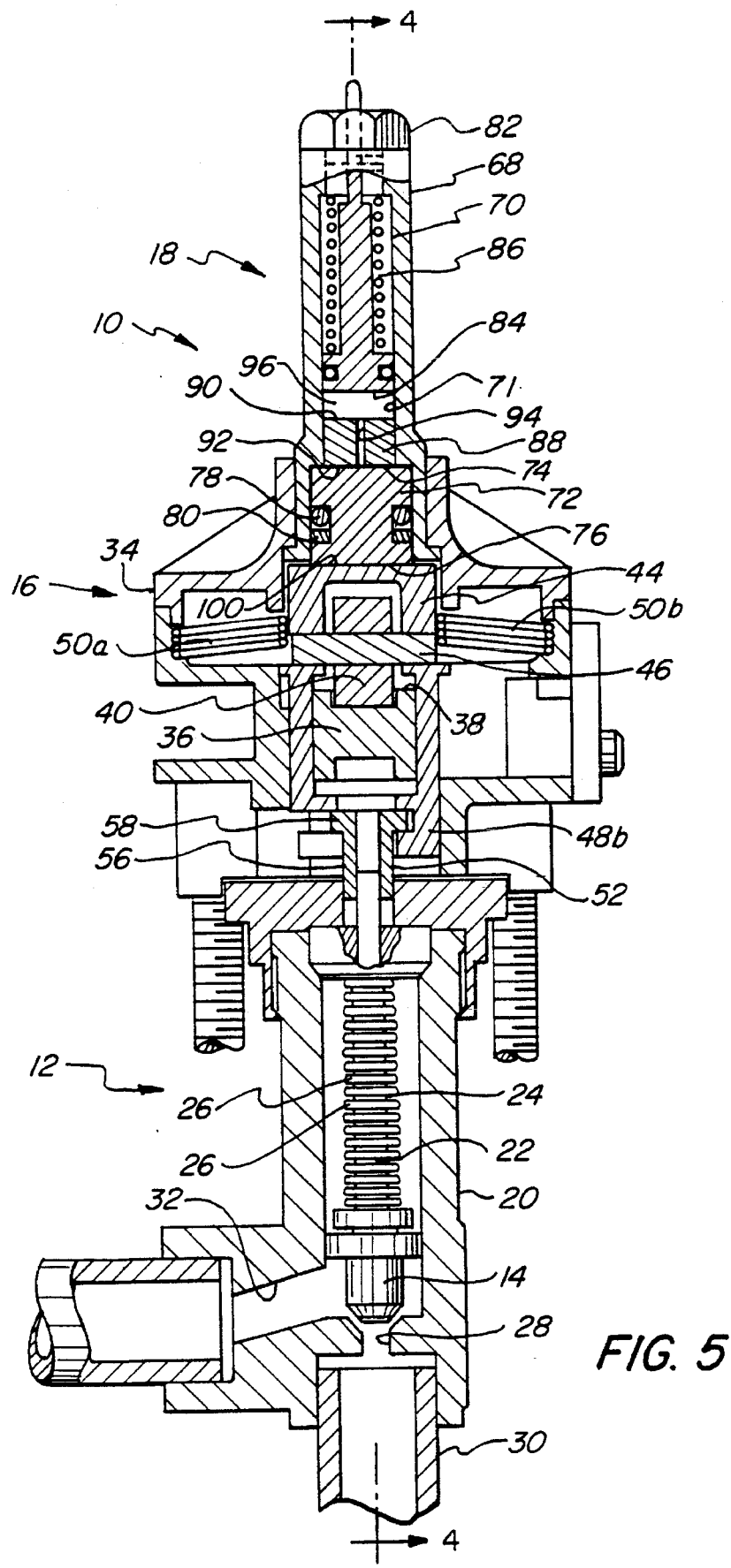
FIG. 5 is a cross sectional view, taken along line 5—5 of FIG. 4.

Valve 12 is generally known in the art. See FIG. 1. One suitable valve can be obtained from Carleton Technologies Inc., located in Tampa Fla., although it should be understood that any suitable valve can be used. As shown in FIGS. 2–5, valve 12 comprises housing 20 which houses stem 14. Stem 14, having central shaft 22, is comprised of housing 24 and bellows 26. Stem 14 is designed to fit tightly on tank orifice 28 and is designed to move between an open and closed position so that the contents of tank 30 may flow freely, when desired, into an adjacent designated area through orifice 32, as shown in FIGS. 3, 5.

Actuator 16 is generally known in the art and can be obtained from Carleton Technologies, Inc. See FIG. 1. Although a mechanical activator means for moving stem 14 has been disclosed, it should be understood that any suitable means, which is capable of being attached to valve housing 20 and activating stem 14, can be used. Other means include electrical, hydraulic, magnetic and various other means.

As shown best in FIGS. 2–5, actuator 16 comprises housing 34 which is secured to valve housing 20 in any suitable manner, such as by fixedly attaching actuator housing 34 to valve housing 20 or by removably attaching actuator housing 34 to valve housing 20 by threading actuator housing into valve housing (not shown).

Actuator 16 further comprises cam 36 having cam surface 38. Roller 40, having central axis 42, is capable of riding along at least a portion of cam surface 38.

Actuator yoke 44 is secured around roller 40 by bar 46, which extends parallel to roller axis 42. See FIGS. 3, 5. Referring again to FIGS. 2, 4, yoke 44 includes two opposed inwardly facing flanges 48a, 48b. Yoke 44 is biased against roller 40 and towards stem 14 by springs 50a, 50b. Plunger 52, having central axis 54, is comprised of housing 56, having projecting lip 58 for interconnecting to and cooperating with yoke flanges 48a, 48b to move stem 14. Central axis 54 of plunger 52 lies in substantially the same plane as central axis 22 of stem 14. Plunger central axis 54 and stem central axis 22 are substantially perpendicular to roller central axis 42.

Actuator handle 60 is attached to actuator housing 34 by inserting quick release pin 62 into pin hole 64. Emergency handle 66 is fixedly attached to cam 36.

Figure 1:
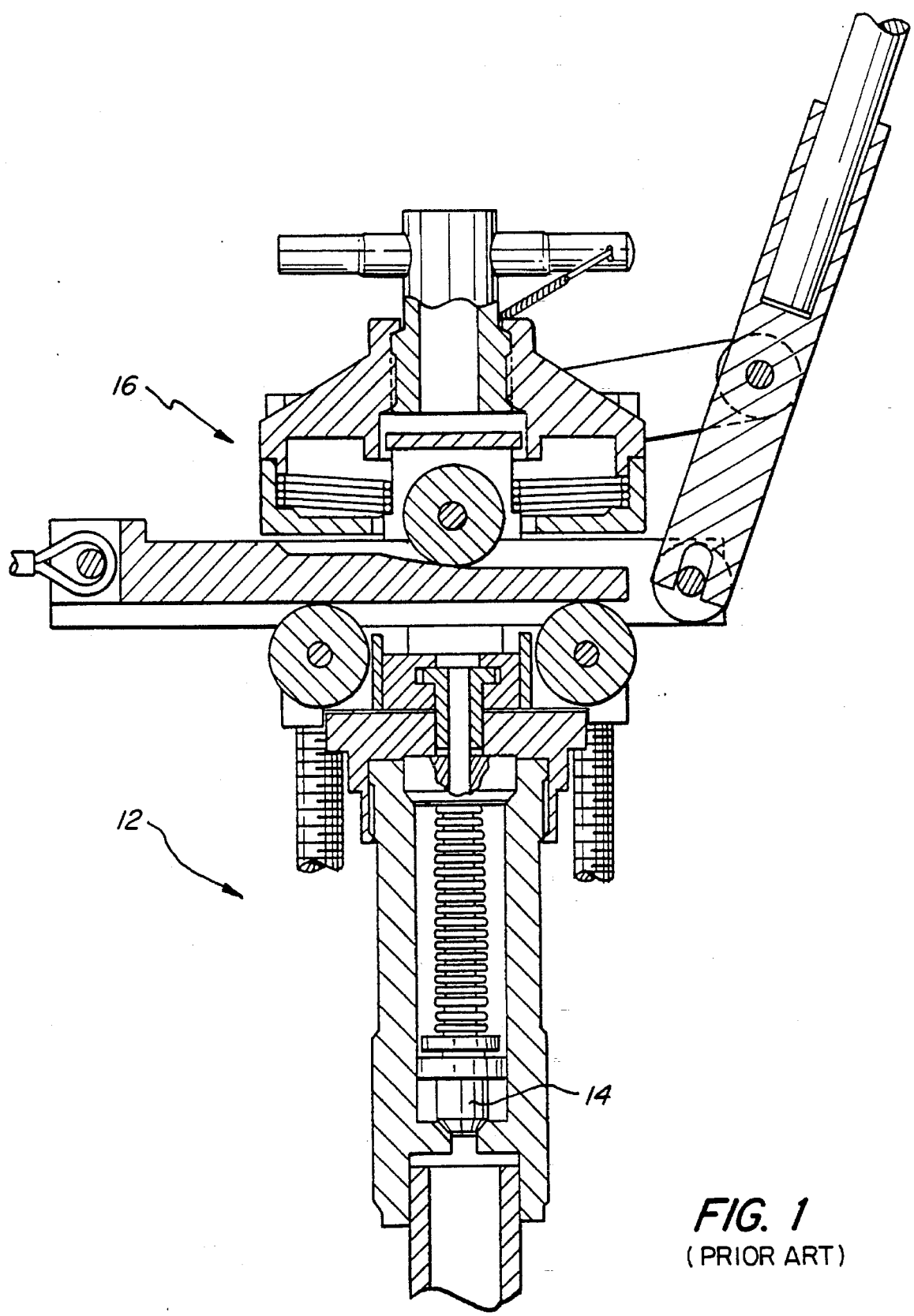
FIG. 1 is a cross sectional view of an actuator and valve, known in the prior art and shown in the closed position.

Actuator 16, shown in FIG. 1, must be modified for attachment to cartridge 18, shown in FIGS. 2–5. Cartridge 18 includes housing 68, which can be made of any suitable material, such as preferably CRES 17-4PH H1075 or other suitable stainless steel material. Cartridge housing 68 can be attached to actuator housing 34 by any suitable method such as by fixedly attaching cartridge housing 68 to actuator housing 34 or by threading (not shown) cartridge housing into actuator housing. Any suitable method may be used so long as cartridge housing is securely fitted to actuator housing when attached.

Cartridge 18 further includes upper piston 70 and lower piston 72, which are adapted to fit snugly within chamber 71 (shown in FIGS. 4, 5) of cartridge housing 68. Lower piston 72 includes upper and lower surfaces 74, 76, respectively, and includes o-ring 78 and backup ring 80. O-ring 78 and backup ring 80 can be made of any suitable material, so long as the o-ring material is compatible with the fluid stored in cartridge 16, discussed below. Upper piston travel 70 is limited in the top of cartridge housing 68 by bolt 82, and includes lower surface 84. Upper piston 70 is biased by spring 86 towards lower piston 72.

As shown in FIGS. 2–5, plug 88, having upper and lower surfaces 90, 92, respectively and channel 94 therethrough, is positioned between upper piston 70 and lower piston 72. In the preferred embodiment, plug 88 is made of titanium. Most preferably, plug 88 is threaded (not shown) into cartridge housing 68, although any suitable method which prevents fluid leakage around plug 88 is acceptable. Plug 88 must also be securely positioned within cartridge housing 68 such that fluid movement or sudden impact forces do not dislodge it.

Preferably, channel 94 is centrally located within plug 88, although any suitable location which allows adequate fluid flow, when desired, will suffice. Plug channel 94 must be sufficiently small to avoid the flow of the fluid during an impact of a short duration, such as an explosion; however, channel 94 must be large enough to permit flow of fluid during manual operation of valve 12. In the preferred embodiment, channel 94 is at least one fiftieth to one seventy-fifth of an inch in diameter, and most preferably one sixty-fourth of an inch in diameter, although channel 94 could be smaller, provided channel 94 allowed fluid to flow during manual operation, or larger, provided fluid flow during shock is avoided.

Pistons 70, 72 are positioned in relation to plug 88 and cartridge housing 68 so as to form upper and lower reservoirs 96, 98, respectively. Plug 88 is securely placed with cartridge housing 68 such that fluid flows between reservoirs 96, 98 only through channel 94.

Reservoirs 96, 98 are filled with any suitable fluid (not shown). Preferably, a fluid is used which acts viscous during impacts of short duration, such as 0.0002–0.5 seconds, although any suitable fluid can be used. For submersible vehicles, a Newtonian fluid is preferably used, such as water, oil or alcohols. In the preferred embodiment, ethylene glycol is used.

Assuming valve 12 is in the closed position, the operation of the shock absorbing device 10 is as follows. In the closed position, shown in FIGS. 2, 3, lower piston 72 is maximally displaced from lower surface 92 of plug 88 and lower surface 76 of lower piston 72 contacts upper surface 100 of yoke 44. Lower surface 84 of upper piston 70 is minimally displaced from plug 88. As such, a majority of the fluid is located in lower reservoir 98. In the preferred embodiment, about seventy-five to eighty percent of the fluid is in lower reservoir 98, about fifteen to twenty-five percent of the fluid is in upper reservoir 96, and a negligible amount of fluid is in channel 94. In the closed position, roller 40 does not contact cam surface 38, although roller 40 could be designed to contact cam surface 38 in both the open and closed positions.

Stem 14 is moved from the closed position, shown in FIGS. 2, 3, to the open position, shown in FIGS. 4, 5, in the following manner. Handle 60 moves cam 36 towards actuator housing 34. Roller 40 rides up cam surface 38 forcing yoke 44 to also rise upward. Yoke 44, interconnected to plunger 52, pulls stem 14 off orifice 28 allowing the contents of tank 30 to feed into orifice 32. See FIG. 5.

Referring again to FIGS. 4, 5, upward movement of yoke 44 forces lower piston 72 to move towards plug 88, forcing fluid to flow through channel 94 and into upper reservoir 96. As the fluid fills upper reservoir 96, it forces spring-biased upper piston 70 to become maximally displaced from upper surface 90 of plug 88. In the open position, upper surface 74 of lower piston 72 is minimally displaced from lower surface 92 of plug 88.

In the preferred embodiment, in the open position, fifty-five to sixty-five percent of the total fluid is in upper reservoir 96, thirty-five to forty-five percent of the total fluid is in lower reservoir 98, and a negligible amount of fluid is in channel 94.

When handle 60 moves cam 36 away from actuator housing 34 to return stem 14 to the closed position, roller 40 rides downwardly bringing yoke 44 with it. As such, spring biased upper piston 70 operates to force fluid from upper reservoir 96, through channel 94, and into lower reservoir 98.

Emergency handle 66 can be used to close valve 12. Handle 66 is pulled away from actuator housing 34, causing roller 40 to drop downwardly.

Advantageously, channel 94 restricts viscous fluid travel during short term high force events, such as a collision or an explosion which typically takes less than about 0.010 seconds. However, channel 94 is large enough to permit the flow of fluid during events of longer duration, such as manual operation, which typically takes at least 0.5 seconds, even during emergency operation.

Because lower piston 72 is in substantially constant contact with yoke 44 which is connected to stem 14, stem 14 has little room for free travel. Viscous fluid prevents the free travel of stem 14 and as such, there is no noticeable stem compression during high impact stresses.

Actuator handle 60 is preferably stored locally and attached to actuator housing 34 by quick release pin 62 when local operation of valve 12 is desired. As such, shock load due to the weight of handle 60 is reduced.

It should be understood by those skilled in the art that obvious modifications can be made without departing from the spirit of the invention. Accordingly, reference should be made primarily to the accompanying claims, rather than the foregoing specification, to determine the scope of the invention.

What is claimed is:

1. A shock absorbing device for a valve, the valve having a valve housing and a stem, the stem movable within the valve housing between an open position and a closed position, the device comprising:

an actuator which comprises an actuator housing connected to the valve housing and moving means within the actuator housing for biasing the valve stem closed and for moving the valve stem from the closed position into the open position, the moving means comprising a yoke operatively connected to the valve stem such that movement of the yoke in a first direction forces the valve stem into the closed position and movement of the yoke in a second direction moves the valve stem into the open position, the yoke biased in the first direction so as to bias the valve stem in the closed position, and opening means for forcing the yoke in the second direction whereby operation of the opening means moves the yoke in the second direction and thereby causes the stem to move from the closed position into the open position;

a dampening cartridge which comprises a housing connected to the actuator housing, a lower piston and an upper piston positioned within the cartridge housing, the lower piston operatively connected to the yoke, and a plug having a channel therethrough, the plug positioned inside the cartridge housing and between the pistons so as to form an upper reservoir between the plug and the upper piston and a lower reservoir between the plug and the lower piston, the upper and lower reservoir being substantially filled with fluid and in fluid communication with each other through the channel, whereby movement of the opening means causes the yoke to move the stem from the closed position to the open position and causes the lower piston to move towards the plug, thereby forcing fluid to flow from the lower reservoir through the plug channel and into the upper reservoir.

2. The shock absorbing device for a valve of claim 1, wherein the upper piston is spring biased towards the plug.

3. The shock absorbing device for a valve of claim 1, wherein the fluid comprises a Newtonian fluid.

4. The shock absorbing device for a valve of claim 1, wherein the fluid comprises ethylene glycol.

5. The shock absorbing device for a valve of claim 1, the plug channel being sufficiently small to avoid flow of the fluid therethrough during an impact of a predetermined force and large enough to permit flow of the fluid during manual operation of the valve.

6. The shock absorbing device for a valve of claim 1, wherein the plug channel is about one sixty-fourth of an inch in diameter.

7. The shock absorbing device for a valve of claim 1, wherein the plug is comprised of titanium.

8. The shock absorbing device for a valve of claim 1, wherein the cartridge housing is comprised of stainless steel.

9. A shock absorbing device for a valve, the valve having a valve housing and a stem, the stem movable within the valve housing between an open position and a closed position, the device comprising:

an actuator which comprises an actuator housing attached to the valve housing, a cam, within the actuator housing, having a cam surface, a yoke, operatively connected to the cam and operatively connected to the valve stem such that movement of the yoke in a first direction forces the valve stem into the closed position and movement of the yoke in a second direction moves the valve stem into the open position, the yoke biased in the first direction so as to bias the valve stem in the closed position, whereby movement of the cam in a direction transverse to the direction of the movement of the yoke forces the yoke to move in a second direction thereby causes the stem to move from the closed position into the open position; and a dampening cartridge which comprises a cartridge housing, the cartridge housing attached to the actuator housing, the cartridge having at least one upper piston, at least one lower piston and at least one plug having a channel therethrough positioned between the pistons inside the cartridge housing, the lower piston operatively connected to the yoke, the pistons being positioned in relation to the plug so as to form an upper and lower reservoir therebetween, the reservoirs being substantially filled with fluid and being in fluid communication with each other through the plug channel, the upper piston being spring biased towards the plug, whereby movement of the cam causes the yoke to move the stem from the closed position to the open position and causes the lower piston to move towards the plug, thereby forcing fluid to flow from the lower reservoir through the plug channel and into the upper reservoir.

10. The shock absorbing device for a valve of claim 9, wherein the fluid comprises a Newtonian fluid.

11. The shock absorbing device for a valve of claim 9, wherein the fluid comprises ethylene glycol.

12. The shock absorbing device for a valve of claim 9, the plug channel being sufficiently small to avoid flow of the fluid during an impact of a predetermined force and large enough to permit flow of the fluid during manual operation of the valve.

13. The shock absorbing device for a valve of claim 9, wherein the plug channel is approximately one sixty-fourth of an inch in diameter.

14. The shock absorbing device for a valve of claim 9, wherein the plug is comprised of titanium.

15. The shock absorbing device for a valve of claim 9, wherein the cartridge housing is comprised of stainless steel.

16. The shock absorbing device for a valve of claim 9, the actuator yoke being spring-biased towards the yoke.

17. A shock absorbing device, comprising:

a valve having a valve housing, and a movable stem located inside the valve housing, the stem having a central axis lying in a plane, the stem being movable within the valve housing between an open position and a closed position;

an actuator which comprises an actuator housing attached to the valve housing, a cam, inside the actuator housing, the cam having a cam surface, a roller, inside the actuator housing, which rides along at least a portion of the cam surface, a yoke, operatively connected to the roller, the yoke being biased towards the stem, a plunger having a central axis, the central axis of the plunger lying in substantially the same plane as the central axis of the stem, the plunger interconnected to the yoke and attached to the stem, whereby movement of the roller causes the yoke to move the plunger and the stem, moving the stem between an open and a closed position; and a dampening cartridge having a housing, the cartridge housing attached to the actuator housing, the cartridge housing having an upper piston, a lower piston and a plug having a channel therethrough, the plug being positioned between the pistons, the upper piston being spring biased towards the plug, the plug positioned inside the cartridge housing and between the pistons so as to form an upper reservoir between the plug and the upper piston and a lower reservoir between the plug and the lower piston, the reservoirs being substantially filled with fluid and being in fluid communication with each other through the plug channel, the lower piston operatively connected to the yoke, whereby movement of the cam causes the yoke to move the stem from the closed position to the open position and causes the lower piston to move towards the plug, thereby forcing fluid to flow from the lower reservoir through the plug channel and into the upper reservoir.

18. The shock absorbing device of claim 17, wherein the fluid comprises a Newtonian fluid.

19. The shock absorbing device of claim 17, wherein the fluid comprises ethylene glycol.

20. The shock absorbing device of claim 17, the plug channel being sufficiently small to avoid flow of the fluid during an impact of a predetermined force and large enough to permit flow of the fluid during manual operation of the valve.

21. The shock absorbing device of claim 17, wherein the plug channel is about one sixty-fourth of an inch in diameter.

22. The shock absorbing device of claim 17, wherein the plug is comprised of titanium.

23. The shock absorbing device of claim 17, wherein the cartridge housing is comprised of stainless steel.

* * * * *